May 11, 1965

C. E. BARRINGTON 3,182,757

SELF-ENERGIZING RING DISC BRAKE

Filed Aug. 14, 1963

INVENTOR.
CHARLES E. BARRINGTON
BY
*J. B. Holden*
ATTORNEY

May 11, 1965 C. E. BARRINGTON 3,182,757
SELF-ENERGIZING RING DISC BRAKE
Filed Aug. 14, 1963 2 Sheets-Sheet 2
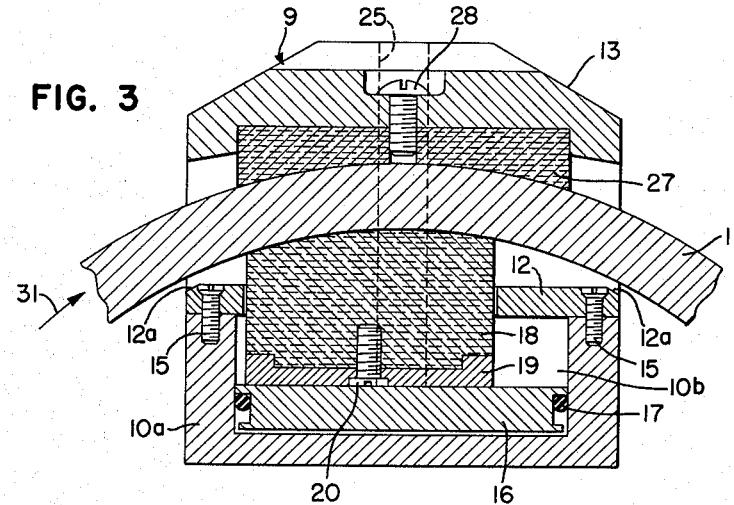
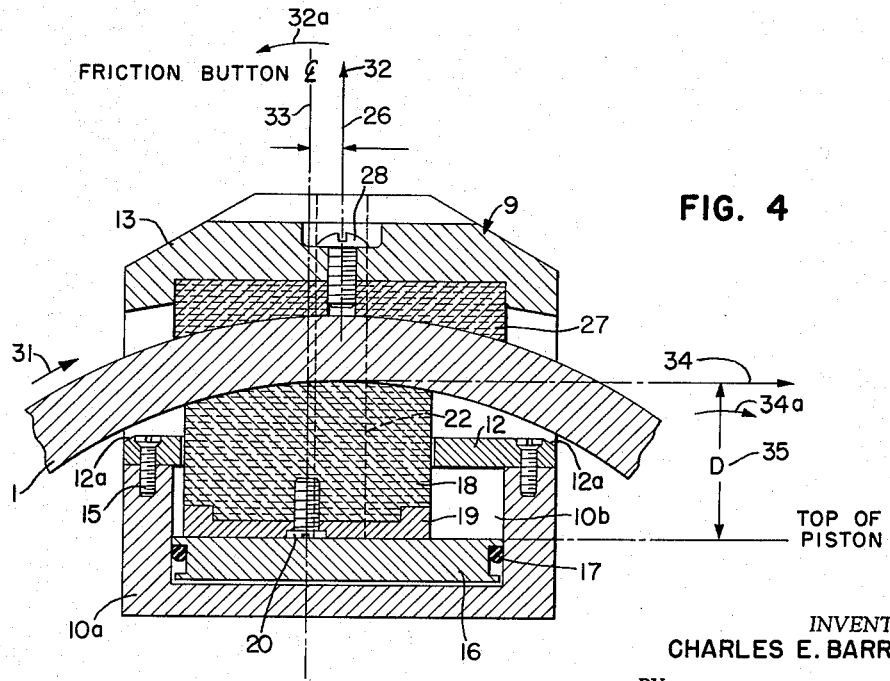
INVENTOR.
CHARLES E. BARRINGTON
BY
J. B. Holden
ATTORNEY

United States Patent Office 3,182,757
Patented May 11, 1965

3,182,757
SELF-ENERGIZING RING DISC BRAKE
Charles E. Barrington, Stow, Ohio, assignor to The Goodyear Tire & Rubber Company, Akron, Ohio, a corporation of Ohio
Filed Aug. 14, 1963, Ser. No. 302,033
9 Claims. (Cl. 188—76)

This invention relates to a self-energizing ring disc brake, and more particularly to a novel construction balancing the rotational moments applied to the piston during actuation to insure balance piston travel and substantially consistent friction lining contact and wear.

It has been known that the use of ring disc brakes has caused uneven wear on the friction buttons or discs, particularly the radially inner button, because the piston carrying the inner button tended to cock in the direction of ring disc rotation when the button engaged the ring disc thereby causing heavy wear on the leading edge of the button and consequent uneven brake button wear. Thus, the inner button must be replaced sooner than the outer button, and further the brake gives erratic and uneven force distribution during the braking action. Further, uneven wear and uneven force distribution on the radially inner button causes uneven wear on the radially outer button so that a generally unsatisfactory braking action results. Efforts have been made to guide the path of the piston to prevent cocking or tilting thereof, but these efforts have been largely unsuccessful due to the high moment of rotation imparted to the piston by the friction button contacting the ring disc.

It is the general object of the present invention to avoid and overcome the foregoing difficulties and objections to prior art practices by the provision of a ring disc brake utilizing a guide pin operatively affixed to the piston and slidably received in the brake housing, and a friction button affixed to the piston being offset towards the leading edge thereof a substantial distance so that the moment of rotation given to the offset friction pad by actuating the piston is substantially equal and opposite to the moment of rotation imparted to the button when the button engages the ring disc.

A further object of the invention is to provide a ring disc brake which is compact, highly effective, durable, and provides substantially even friction button wear by utilizing a guide pin and by offsetting the radially inner friction button towards the leading edge thereof.

A further object of the invention is to provide a ring disc brake wherein the radially inner friction button is offset towards the normal leading edge thereof in order to create a rotational moment thereto when actuated substantially equal and opposite to the rotational moment created when the friction button engages the ring disc, and which utilizes a guide pin affixed to the actuating piston and slidably received in the brake housing to offset any imbalance in the opposite rotational moments and insure radial movement of the actuating piston.

A further object of the invention is to provide a ring disc type brake utilizing a guide pin to substantially insure even friction button wear, and which unit is simple, highly effective, and low in cost.

The aforesaid objects of the invention, and other objects which will become apparent as the description proceeds, are achieved by providing the combination in a brake of a fixed member, a rotary member mounted for rotation relative to the fixed member, a ring-disc, means securing the ring disc to the rotary member, a C-shaped brake unit straddling the ring-disc, the brake unit being mounted for substantially radial movement in relation to the ring-disc, a friction block in the unit adapted to engage the radially outer surface of the ring-disc, a second friction block in the unit adapted to engage the radially inner surface of the disc, piston means slidably and operatively carried by the unit for moving the second named friction block into engagement with the ring-disc, a guide pin operatively affixed to the piston means and slidably received in the brake unit, the guide pin insuring balanced substantially radial piston travel, the second named friction block being radially offset from the center axis of the piston means in a direction opposite to the normal direction of rotation of the ring-disc a distance sufficient to produce a moment of rotation caused by the piston means forcing the second named friction block against the ring-disc which is substantially equal and opposite to the moment of rotation imparted to the second named friction block by engagement with the rotating ring-disc.

For a better understanding of the invention reference should be had to the accompany drawings, wherein.

Figure 1:
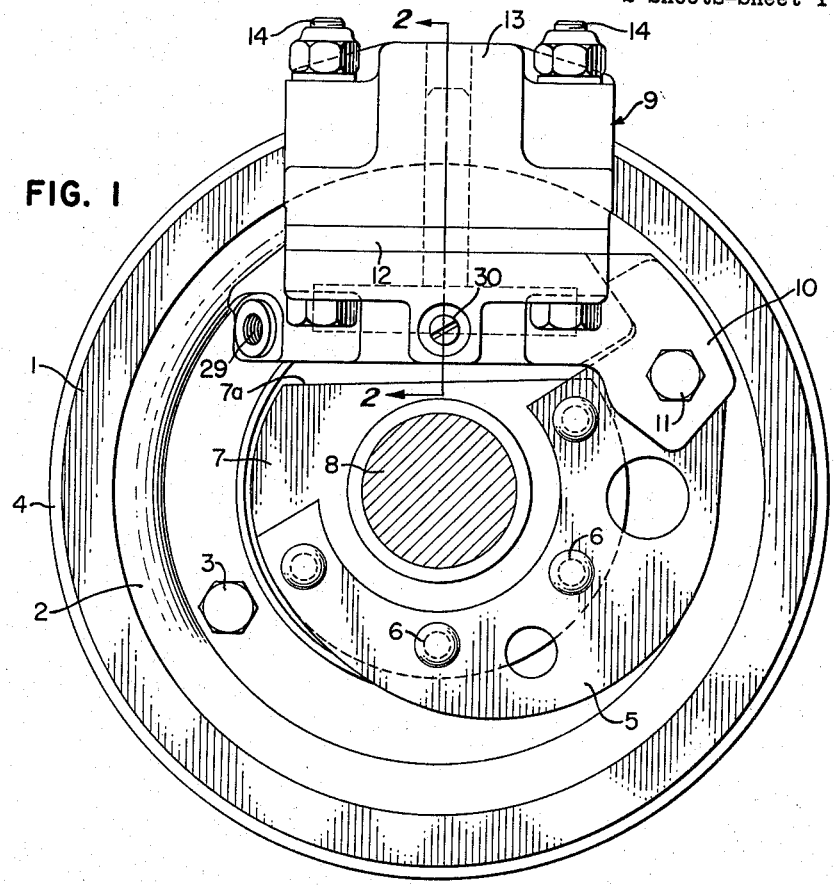
FIGURE 1 is a front elevation of one embodiment of a brake incorporating the principles of the invention.
Figure 2:
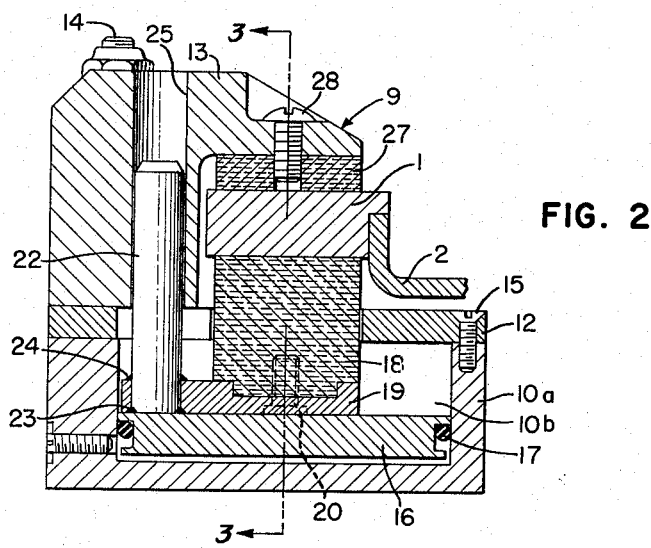
FIGURE 2 is a vertical cross sectional view of the brake unit taken on line 2—2 of FIGURE 1, with the ring disc broken away from its mounting.

FIGURE 3 is a vertical cross sectional view of the embodiment of the invention illustrated in FIGURE 1, taken substantially on the line 3—3 of FIGURE 2; and FIGURE 4 is a vertical cross sectional view, similar to FIGURE 2, but showing more clearly the offset mounting of the radially inner friction button in relation to the piston, which mounting achieves the substantially equal and opposite rotational moment to balance the rotational moment caused by the engagement of the friction button with the ring disc.

In FIGURE 1 of the drawings, the numeral 1 indicates generally the rotary brake member, this taking the form of a radially thick endless metal ring, preferably called a ring disc, welded at its inboard side to a steel cup 2. The cup 2 is fixedly secured at its base by bolts 3, which secure the halves of a wheel 4 together, and the cup 2 to the wheel 4. The ring disc 1 is usually formed of inexpensive steel or cast iron, which are less expensive materials than are normally required on flat disc brakes. In the embodiment of the invention shown, the wheel is of cast magnesium.

The stationary portion of the brake assembly includes a metal torque plate 5 adapted to be secured, for example, at holes 6 by bolts, rivets, or suitable means to a flange 7 fixed to a stationary axle 8 rotatably supporting the wheel 4. The torque plate 5 is spaced axially from flange 7 so as to align the torque plate 5 with the medium plane of the ring disc 1. Also, the top of the flange 7 is flattened at 7a to allow clearance for the movement of a braking unit, indicated as a whole by the numeral 9. The braking unit 9 is attached to the torque plate 5 by means of a bifurcated arm 10, pivotally hinged thereto by bolt means 11. A more detailed description of the single pivotal hinged mounting of the brake unit 9 can be found in an application entitled "Self-Energizing Hinge Type Ring Disc Brake," Serial No. 246,972, filed December 26, 1962 by Jesse G. Hawley, et al.

The utility of the invention resides in the novel construction in the brake unit 9. The brake unit 9 includes a housing made up of a lower, or radially inner portion 10a formed with a piston-receiving chamber 10b, a torque-carrying plate 12, and an upper or radially outer portion of inverted L-shape 13, the parts being held together with a pair of bolts 14. The torque-carrying plate 12 is additionally secured to the lower housing portion 10 with bolts 15. Marginal portions of the upper surface of the plate 12 are suitably beveled at 12a to provide clearance for the ring disc 1. The invention contemplates that a shim disc could be placed between the upper housing 13 and the torque-carrying plate 12 so the brake unit 9 could be used with brakes having ring discs 1 of different radial thicknesses.

A slidable piston 16, having O-ring 17 in a peripheral groove thereon, is received in cylinder 10a. A friction button 18 is affixed to a sub-piston 19 by screw 20. The invention contemplates that the sub-piston 19 ride freely on top of the piston 16. The friction button 18 removably engages the screw 20 to facilitate changing the friction button 18 when it is sufficiently worn.

In order to provide radial guidance to the piston 16, a guide pin 22 is operatively affixed thereto as by a welded joint 23. Guide pin 22 extends through the sub-piston 19, and is welded thereto, as at 24. Guide pin 22 further extends into the upper housing 13 in slidable relation by being received in a hole 25. The guide pin 22 is on the lateral periphery of the piston 16 when viewed in the plane of rotation, but it is on the center line of piston 16 when viewed normal to the plane of rotation. Thus, the center line of pin 22 falls in a plane normal to the ring disc 1 containing the center line of the piston 16. The location of pin 22 is not critical to the principles of the invention as pin 22 is a guide and a means to absorb unbalance in the rotational moments as described below to insure balanced travel of piston 16. However, preferably the guide pin 22 should be mounted near the outer periphery of piston 16 and out of alignment with ring disc 1 so that the piston 16 will tend to pivot around pin 22 when the friction button 18 engages ring disc 1. In this manner the piston 16 absorbs all tangential forces and the guide absorbs only rotational forces to prevent cocking or tilting of piston 16.

It should be noted, however, that the center line of piston 16 is offset from the center line of the friction button 18 as indicated by the screw 20. This offset, as indicated by numeral 26 in FIGURE 4, in combination with the guide pin 22 provide the essence of the invention, and will be more fully described hereinafter. It can be said to be an upstream offset of the friction button from the center line of its support means.

Completing the assembly of the brake unit 9, a friction button 27 is secured in place by conventional means such as screws 28 in the upper and outer housing portion 13, as best seen in FIGURE 3. A hole 29, and bleeder 30, as best seen in FIGURE 1 are provided to place fluid pressure under piston 16.

With reference to FIGURE 4, the normal rotation of ring disc 1 is indicated by arrow 31, and it can be seen that the offset of the friction button 18, and sub-piston 19 is against the direction of rotation or toward the leading edge of friction button 18. Thus, when pressure is applied beneath the piston 16 causing radial movement of the friction button 18 to engage the ring disc 1, a force indicated by arrow 32 is directed onto the friction button 18 and offset from the center line 33 by the amount indicated generally by the numeral 26. This causes a moment of rotation of the friction button 18, a sub-piston 19, and piston 16 in a counterclockwise direction, when looking at FIGURE 4, as indicated by arrow 32a. However, the engagement of friction button 18 with ring disc 1 also causes a force tangential to the curvature of friction button 18, as indicated by arrow 34. Because the force indicated by arrow 34 is offset from the top of piston 16, by a distance D indicated by numeral 35, a moment of rotation is imparted to the friction button 18, sub-piston 19 and piston 16 in a clockwise direction equal to force 34 times distance 35, and indicated by arrow 34a.

Theoretically, it would be desirable for the moment of rotation in the counterclockwise direction defined by force 32 times offset 26 and indicated by arrow 32a, to equal the moment of rotation in the clockwise direction defined by force 34 times distance 35 and indicated by arrow 34a so that the rotational forces would be equal and opposite and thereby cancelling each other. In essence, this is what is intended, but in practice it is very hard to achieve. Thus, any difference in the moments of rotation is counterbalanced and overcome by the close fitting alignment of the pin 22 in the hole 25 so that smooth, and uniform wear is achieved on the friction button 18 to insure smooth, steady, and efficient braking action by the unit 9.

Obviously, if the ring disc 1 is rotating in the opposite direction to that indicated in FIGURE 4, the results of the invention are not completely achieved, as the offset friction button 18 does not serve a balancing function. However, guide pin 22 offsets all rotational moments to the piston 16 to insure a balanced radial piston movement to achieve the objects of the invention. However, the invention contemplates that ring disc 1 will be rotating in the predetermined direction a substanttial majority of the time so that the balancing action of the offset friction button 18 may be utilized.

It should be further recognized that since the brake unit 9 is pivotally mounted, when pressure is placed beneath piston 16, it causes the entire unit 9 to pivot thereby providing a smooth engagement of upper friction button 27 on the radially outward surface of ring disc 1. This action is more fully described with reference to the above-cited patent application.

From the foregoing, it is seen that the objects of the invention have been achieved by offsetting the radially inner friction button in an upstream direction, or toward the leading edge thereof in the plane of the ring disc in order to impart a moment of rotation to the inner friction button, when actuated by its piston, which is substantially equal and opposite to the moment of rotation imparted when the ring disc engages the radially outer surface of the friction button. A guide pin is operatively affixed to the piston to overcome any imbalance in the rotational moments to further insure a balanced radial piston movement. Thus, cocking, or uneven wear of the friction button is eliminated providing an essentially constant friction braking surface to insure continuous, efficient, and highly effective braking action combined with long button wear.

While in accordance with the patent statutes one best known embodiment of the invention has been illustrated and described in detail, it is to be particularly understood that the invention is not limited thereto or thereby, but that the inventive scope is defined in the appended claims.

What is claimed is:

1. In a brake unit for a rotatable member mounting a ring disc normally rotating in only one direction the combination of a housing stationarily mounted for pivotal movement in relation to said rotatable member, said housing extending around said ring disc to provide radially outer and radially inner portions therein, a friction button removably received and positioned in the radially outer portion of said housing, said friction button being contoured to engage the radially outer surface of said ring disc, piston means slidably received and centrally aligned in said housing on the radially inner portion thereof, guide pin means operatively affixed to said piston means and slidably received in said housing to guide radial movement of said piston means, said guide pin means being affixed to the outer peripheral edge of said piston means in a radial plane perpendicular to said ring disc and including the center line of said piston, and a friction button removably affixed to said piston, said second-named friction button being offset toward the leading edge thereof with respect to the normal rotation of said ring disc, said second-named friction button being contoured and adapted to engage the radially inner surface of said ring disc, said offset of said second-named friction button causing a moment of rotation to said piston when a sufficient force is applied thereto which is substantially equal and opposite to the moment of rotation imparted to said piston by the engagement of said second-named friction button with the radially inner surface of said ring disc when said ring disc is rotating.

2. The combination in a brake of an axle, a wheel rotatably mounted on the axle normally rotated only in one direction and adapted to carry a beaded pneumatic tire, a ring-disc, a cup-shaped member securing the ring disc to the wheel adjacent the side of the bead seat for the tire, the member being secured to the base of the wheel and otherwise spaced from the wheel, a torque flange secured to the axle in substantially the central plane of the ring disc, a C-shaped brake unit straddling the ring disc, a single pivot means pivotally securing the unit to the torque flange, said unit including a radially inner portion, a radially outer portion, an interposed torque-carrying plate and bolt means lying to the outboard side of the ring disc securing the unit together, a block of friction material releasably carried by the outer portion and adapted to engage the radially outer surface of the ring disc, a piston slidably mounted in a cylinder opening in the inner portion, a sub-piston engaging with the piston, said sub-piston having its center line substantially offset from the center line of the piston with said offset being toward the leading edge thereof with respect to the normal rotation of the ring disc, a block of friction material carried by the sub-piston and adapted to engage with the radially inner surface of the ring disc, the offset of said sub-piston being a distance from the center line of the piston so that when braking force is applied the moment of rotation to the sub-piston caused by the offset and the force applied to the piston can be made substantially equal and opposite to the moment of rotation imparted to said sub-piston by the engagement of last said friction material to the radially inner surface of said ring disc when said ring disc is rotating in its normal direction.

3. The combination in a brake of a fixed member, a rotary member mounted for rotation relative to the fixed member, a ring-disc, means securing said ring disc to the rotary member, a C-shaped brake unit straddling the ring-disc, said brake unit being mounted for pivotal movement in relation to said ring-disc, a first friction block in said unit adapted to engage the radially outer surface of said ring disc, a second friction block in said unit adapted to engage the radially inner surface of said disc, piston means slidably and operatively carried by said unit for moving said second-named friction block into engagement with said ring-disc, said second-named friction block having its center axis radially offset from the center axis of said piston means in a direction opposite to the normal direction of rotation of said ring-disc a distance sufficient to produce a moment of rotation caused by said piston means forcing said second-named friction block against said ring-disc which moment of rotation can be adjusted to be substantially equal and opposite to the moment of rotation imparted to said second-named friction block by engagement with the rotating ring-disc.

4. In a brake unit for a rotatable member mounting a ring disc which normally rotates in only one direction the combination of a housing non-rotatably mounted for radial movement with respect to said rotatable member, a friction button removably received by said housing and adapted to engage the radially outer surface of said ring disc, a piston slidably received in said housing, a radially extending guide pin operatively affixed to said piston and slidably received by a hole in said housing in close fitting relation thereto for radially guiding said piston, means to provide pressure beneath said piston to effect movement thereof, a sub-piston operatively affixed to the top of said piston, said sub-piston having its center axis offset from the axis of said piston toward the leading edge thereof with respect to the normal direction of rotation of said ring disc, a second friction button removably received by said sub-piston and adapted to engage the radially inner surface of said ring disc when moved by a force from said piston, said moving force of said piston when applied to said second friction button through said offset sub-piston causing a moment of rotation to said second friction button substantially equal and opposite to the moment of rotation to said second friction button caused by the engagement thereof with said ring disc when said ring disc is rotating in its normal direction.

5. In a brake unit for a rotatable member mounting a ring disc the combination of a housing mounted for substantially radial movement in relation to said rotatable member, a friction button removably received and uniformly positioned in the radially outer portion of said housing, said friction button contoured and adapted to engage the radially outer surface of said ring disc, piston means slidably received and centrally aligned in said housing on the radially inner portion thereof, guide pin means operatively affixed to said piston means and slidably received in said housing to guide radial movement of said piston, a friction button operatively affixed to said piston, said second-named friction button having its center axis offset radially from the center line of said piston in a direction away from the normal rotation of said ring disc, said second-named friction button adapted to engage the radially inner surface of said ring disc, said offset of said second-named friction button causing a moment of rotation to said piston when a force is applied thereto which is substantially equal and opposite to the moment of rotation to said piston caused by the engagement of said second-named friction button to the radially inner surface of said ring disc when such ring disc is rotating in its normal direction.

6. The combination in a brake of a fixed member, a rotary member mounted for rotation normally in only one direction relative to the fixed member, a ring-disc, means securing said ring disc to the rotary member, a brake unit straddling the ring-disc, said brake unit mounted for limited substantially radial movement in relation to said ring-disc, a friction block in said unit adapted to engage the radially outer surface of said ring disc, a friction block in said unit adapted to engage the radially inner surface of said disc, pressure means carried by said brake unit for moving said second-named friction block into engagement with said ring-disc, said second-named friction block having its center axis radially offset from the center axis of said pressure means toward the leading edge thereof with respect to the normal direction of rotation of the ring disc, said offset producing a moment of rotation to said second-named friction block caused by said means forcing it against said ring-disc which moment of rotation is substantially equal and opposite to the moment of rotion imparted to said second-named friction block by the rotation of said ring-disc.

7. The combination in a brake of a fixed member, a rotary member mounted for rotation normally in one direction relative to the fixed member, a ring-disc, means securing said ring disc to the rotary member, a C-shaped brake unit straddling the radially inner and outer surfaces of the ring-disc and being operatively carried by said fixed member, a first friction block operatively positioned in said brake unit adapted to engage the radially outer surface of said ring disc, a second friction block operatively positioned in said brake unit adapted to engage the radially inner surface of said ring disc, piston means carried by said brake unit for moving said second friction block into engagement with said ring-disc, said second friction block having its center axis radially offset from the center line of said piston means toward the leading edge thereof with respect to the normal direction of rotation of the ring disc so that said second friction block may have a moment of rotation caused by said piston means engaging said second friction block to said ring-disc which is substantially equal and opposite to the moment of rotation caused by said second friction block engaging with the rotating ring-disc, and guide means operatively secured to said piston means and slidably engaging said fixed means to aid in positioning said second friction block for radial movement only in relation to said ring-disc.

8. In a brake unit for a rotatable member mounting a ring disc the combination of
- a housing non-rotatably mounted for limited radial movement with respect to said rotatable member,
- a friction button removably received by said housing and adapted to engage the radially outer surface of said ring disc,
- a piston slidably received in said housing,
- a radially extending guide pin operatively affixed to said piston and slidably received by a hole in said housing in close fitting relation thereto,
- means to provide pressure beneath said piston to effect movement thereof,
- a sub-piston operatively affixed to the top of said piston,
- a second friction button removably received by said sub-piston and adapted to engage the radially inner surface of said ring disc when moved by a force from said piston.

9. In a brake unit for a rotatable member mounting a ring disc the combination of
- a housing mounted for limited substantially radial movement in relation to said rotatable member,
- a first friction button removably received and uniformly positioned in the radially outer portion of said housing, said first friction button contoured and adapted to engage the radially outer surface of said ring disc,
- piston means slidably received and centrally aligned in said housing on the radially inner portion thereof,
- guide pin means operatively affixed to said piston means and slidably received in said housing to guide radial movement of said piston, said guide pin means being affixed to the outer peripheral edge of said piston means in a radial plane substantially perpendicular to said ring disc, said guide pin means absorbing rotational moments imparted to said piston upon actuation to insure balanced substantially radial movement of said piston, and
- a second friction button operatively affixed to said piston.

References Cited by the Examiner
UNITED STATES PATENTS

| 2,563,392 | 8/51 | Butler | 188—152 |
| 2,783,858 | 3/57 | Murphy | 188—76 |
| 2,963,116 | 12/60 | Peras | 188—152 |
| 3,052,327 | 9/62 | Yazell et al. | 188—76 |

ARTHUR L. LA POINT, *Primary Examiner.*